(12) United States Patent
Sakaguchi et al.

(10) Patent No.: US 6,408,091 B1
(45) Date of Patent: *Jun. 18, 2002

(54) INFORMATION PROCESSING METHOD AND APPARATUS WITH MIXING OF PROCESSING COMMAND INPUT STROKES AND INPUT STROKES FOR PATTERNS

(75) Inventors: Katsuhiko Sakaguchi, Kawasaki; Tsunekazu Arai, Tama; Eiji Takasu, Yokohama; Hiroto Yoshii, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/637,156

(22) Filed: Apr. 24, 1996

(30) Foreign Application Priority Data

Apr. 28, 1995 (JP) .............................................. 7-106194

(51) Int. Cl.⁷ ................................................ G06K 9/00
(52) U.S. Cl. ....................................... 382/187; 382/311
(58) Field of Search ................................. 382/187, 189, 382/309, 310, 311

(56) References Cited

U.S. PATENT DOCUMENTS

| | | | | |
|---|---|---|---|---|
| 4,685,142 A | * | 8/1987 | Ooi et al. | .................... 382/185 |
| 4,953,225 A | * | 8/1990 | Togawa et al. | ............. 382/187 |
| 5,267,327 A | * | 11/1993 | Hirayama | ................... 382/161 |
| 5,500,937 A | * | 3/1996 | Thompson-Rohrlich | .... 395/161 |
| 5,659,639 A | * | 8/1997 | Mahoney et al. | ........... 382/309 |
| 5,999,648 A | * | 12/1999 | Yamaguchi | .................. 382/189 |

FOREIGN PATENT DOCUMENTS

EP       0564827       10/1993

OTHER PUBLICATIONS

"Issues in Combining Marking and Direct Manipulation Techniques", Kurtenbach, G. et al., Proceedings of the Symposium for User Interface Software and Technology (UIST), Hilton Head, S. Carolina, Nov. 11–13, 1991.

"Newton, MessagePad 110 Handbook", 1994, Apple Computer, Inc., Cupertino, CA, USA XPOO2047153, pp. 83–113.

* cited by examiner

*Primary Examiner*—Jon Chang
(74) *Attorney, Agent, or Firm*—Fitzpatrick, Cella, Harper & Scinto

(57) ABSTRACT

The present invention is to discriminate and extract a gesture stroke from a group of input strokes when inputting, in a batch processing, both a character or symbol of strokes to be processed and a gesture of strokes selecting a process to be executed for the character or symbol, and execute a process selected by the gesture stroke for all the strokes but the extracted gesture stroke, so that the character or symbol and the gesture do not need inputting individually at time intervals, thus improving the operability.

46 Claims, 9 Drawing Sheets

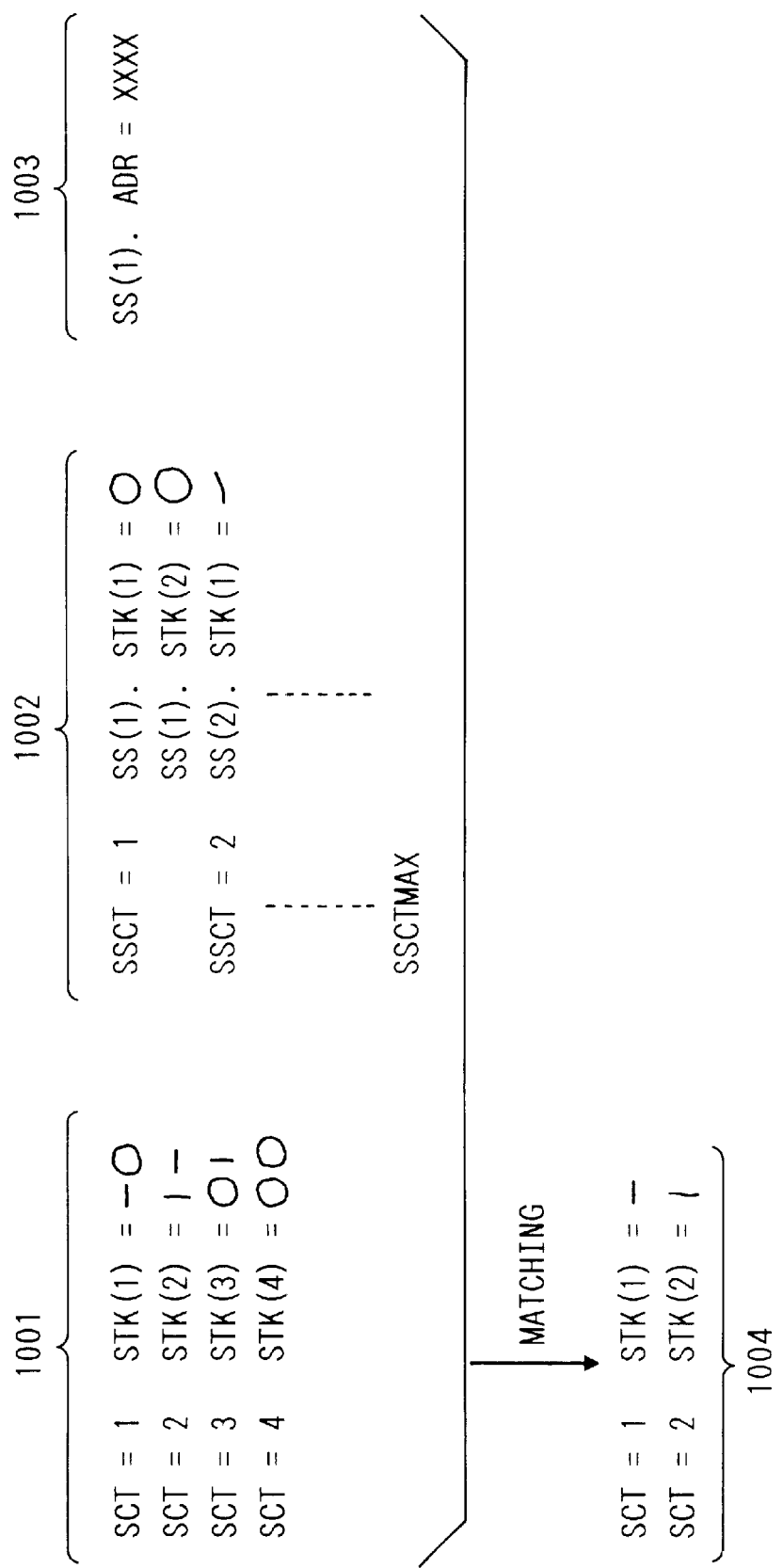

INFORMATION PROCESSING METHOD AND APPARATUS WITH MIXING OF PROCESSING COMMAND INPUT STROKES AND INPUT STROKES FOR PATTERNS

BACKGROUND OF THE INVENTION

1. Field of the Invention

This invention relates to information processing method and apparatus in which different kinds of data included in data input as locus information are divided so that a respective process adapted for each divided data can be executed.

Also, it relates to data processing method and apparatus and, more particularly, to handwriting-character recognizing method and apparatus in which an input locus is recognized as an operation command with pen and digitizer used as coordinate pointing means, or character recognition is executed by recognizing the input locus.

2. Related Background Art

In a conventional apparatus for executing handwriting-character recognition, one character of stroke data is extracted so that character recognition is executed for the one character by using the stroke data as data to be input in the recognition process. Such handwriting-character recognition can be executed on the assumption that the stroke data to be input here are only stroke data constituting a character to be recognized. In other words, the character-recognition process is a process for executing character recognition only.

Many electronic devices for pen input include gesture command input means which can input, in an input mode, not only characters or locus information, but also operation commands using a pen.

Conventionally, each of such gesture commands has an input locus predetermined for each command, so that the corresponding command is executed when the predetermined input locus is recognized.

To clearly discriminate the gesture commands from mere locus or character inputs to be recognized, the gesture commands can be executed in a different mode, or formats of gesture input and character input can be defined separately. As such above, the conventional apparatus is designed to perform the character input and the command input in a different manner that only characters are input in the character input process, and various types of commands are input as gesture commands after end operation of character recognition.

In such an apparatus, however, control of the character-recognition process or execution of other command often need executing during character input such as to specify the type of an input character during character input or to learn a recognition pattern.

The conventional apparatus nevertheless requires an operator or user to intentionally perform the character input for character recognition and the gesture input for command execution, separately, and this gives the user trouble.

Also, such control means depend on the type of a character-recognition engine used for character recognition and, if the recognition processing engine can be rearranged in each system like a conventional front-end processor for Kana-Kanji conversion, it is impossible to previously incorporate all the recognition control means into the system.

SUMMARY OF THE INVENTION

The present invention has been accomplished under the circumstances as aforementioned, and an object thereof is to provide data processing method and apparatus which can recognize data and a given command for the data individually even when inputting the data and command together so that a process corresponding to the given command is executed for the data.

In attaining the above object, an image inputting method according to the present invention include:
- a first-stroke input step for inputting a first stroke;
- a second-stroke input step for inputting a second stroke; and
- a second-stroke processing step, when the first stroke and a given stroke match with each other, for executing a given process for the second stroke.

Another aspect of the present invention is to provide an image inputting apparatus including:
- first-stroke input means for inputting a first stroke;
- second-stroke input means for inputting a second stroke; and
- second-stroke processing means, when the first stroke and a given stroke match with each other, for executing a given process for the second stroke, wherein
- the first and second strokes are input to the same input location by the first-stroke input means and the second-stroke input means, respectively.

Still another aspect of the present invention is to provide an information processing apparatus including:
- input means for inputting strokes;
- extraction means for extracting a given stroke from all the input strokes;
- selection means for selecting a corresponding symbol based on all the strokes but the one extracted in the extraction means; and
- symbol processing means for executing, for the symbol, a given process corresponding to the given stroke.

BRIEF DESCRIPTION OF THE DRAWINGS

The above and other objects and advantages and further description will now be discussed in connection with the drawings, in which:

FIG. 10 is a diagram showing examples of internal processing data used in the second embodiment of the present invention.

DETAILED DESCRIPTION OF THE PREFERRED EMBODIMENTS

First Embodiment

A data processing apparatus according to a first embodiment of the present invention features a structure including a specific-stroke discriminating portion for determining whether a specific stroke is included in the input strokes, a specific-stroke extracting portion for extracting the specific stroke from the input strokes, and a specific-process executing portion for executing a process based on the type of the specific stroke, so that character recognition is executed by writing the specific stroke in the input character, while various processes are executed for the input character.

Figure 1:
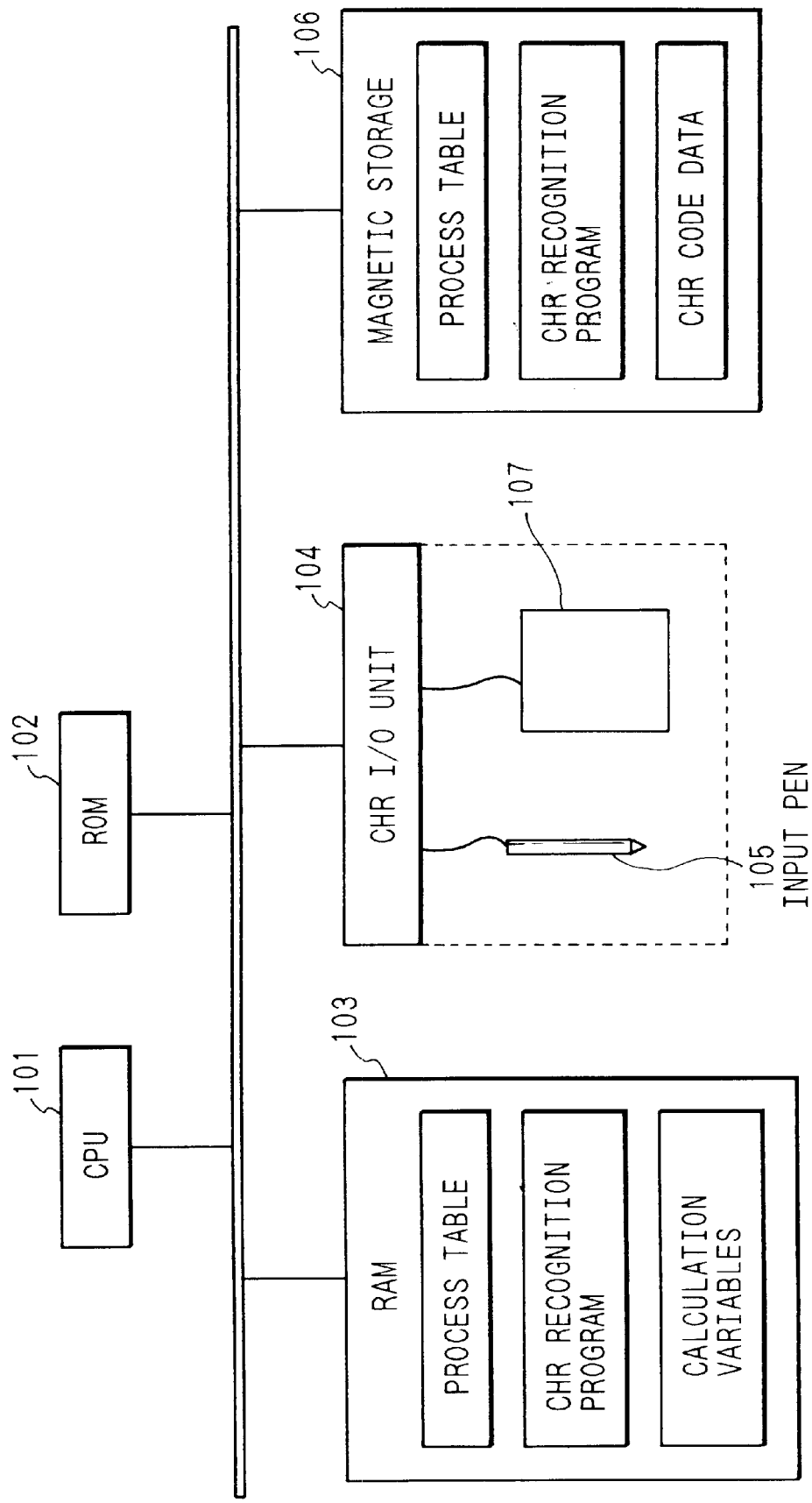
FIG. 1 is a block diagram showing a structure of a data processing apparatus according to a first embodiment of the present invention.

FIG. 1 shows a basic structure of a handwriting-character recognizing apparatus according to the embodiment of the present invention.

In FIG. 1, a CPU 101 is a central processing unit for executing system control and operation; a ROM 102 is operative to store an initial program needed at system operating time. A RAM 103 is a storage capable of input and output, and operative to temporarily store a process table and a character recognition program stored in a magnetic storage, data generated at each processing time and such.

A character input/output unit 104 controls data input and output on a data input/output panel 107. The data input is performed by writing a character by hand on the data input/output panel 107 using an input pen 105. A coordinate input means such as a digitizer or a touch panel can be used for the character input, whereas a display on which image data and patterned character data can be displayed, such as a liquid crystal display, can be used for the character output.

The magnetic storage 106 stores the process table for executing a specific process corresponding to a specific stroke, the character recognition program, a control program to be used in processing steps described later, data of a character-code table. These data or programs are transferred to the RAM 103 and executed by the CPU 101 reading out them from the RAM 103, respectively.

The magnetic storage 106 may be removable from and attachable to the apparatus body, or may be replaced with a storage of other type than magnetic. Furthermore, all kinds of control programs to be stored in the RAM 103 may be read out from other apparatus through a communication means such as a public network or a LAN.

Figure 2:
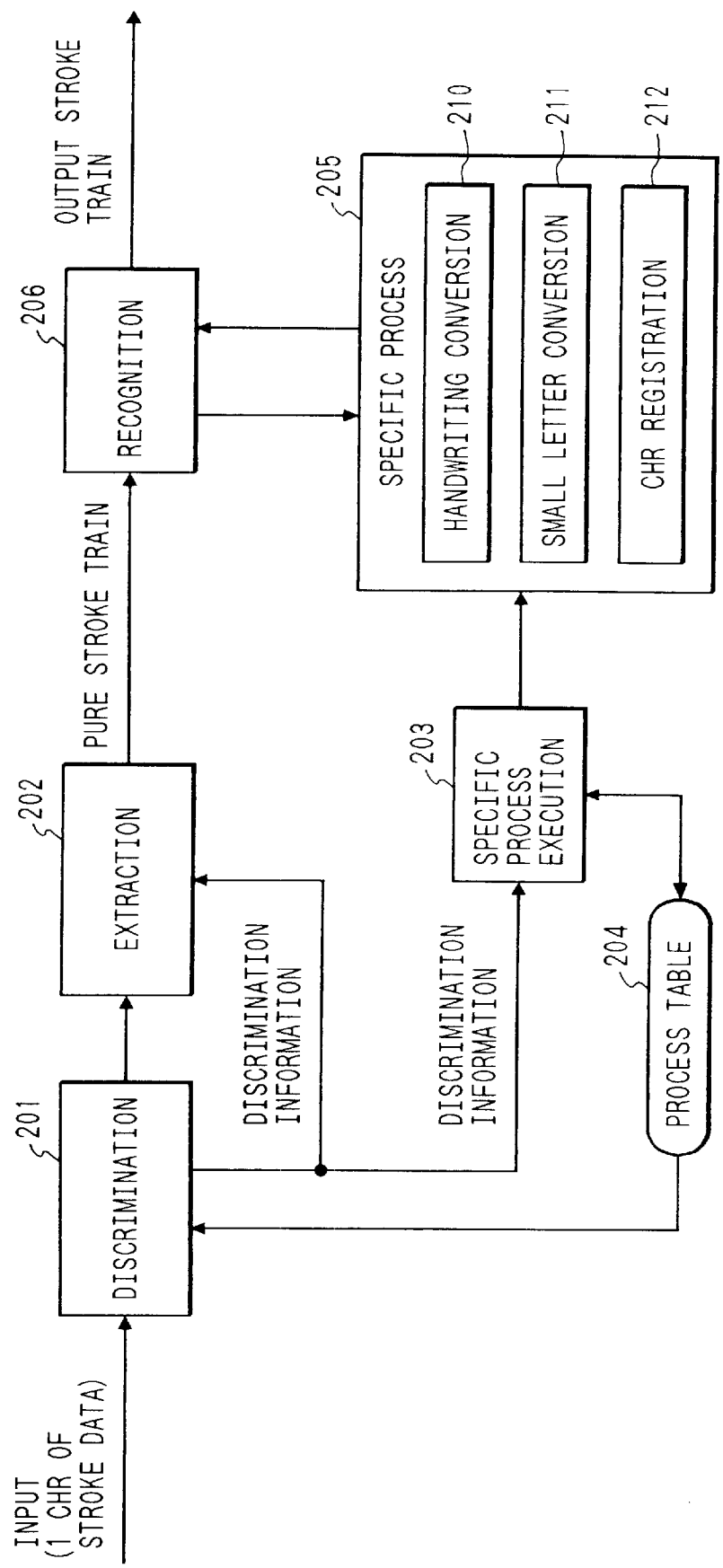
FIG. 2 is a block diagram explaining a general data process according to the first embodiment of the present invention.

FIG. 2 shows a structure of the process according to the embodiment of the present invention, expressing the characteristics of the present invention best. The process shown in FIG. 2 is a recognition process using a pen input device such as a pen computer, in which one character of strokes written in a character input frame is used as input data to be executed. Various methods can be used to determine that the one character of stroke data has been input completely, for example, such as to determine that the one character of stroke data has been input completely at the time when the pen has not been put down in the character input frame during a predetermined period of time (e.g., 1 second) since the pen was moved away from the frame, or when the pen input was started in the next character input frame.

Hereinbelow, a description will be made to the recognition process according to the embodiment with reference to FIG. 2. Portions in FIG. 2 are software components each loaded from the storage 106 as a control program, stored as a character recognition program in RAM 103 and read out to the CPU 101 for executing the process.

In FIG. 2, a specific-stroke discriminating portion 201 determines whether a single or plural specific-strokes exist in one character of stroke data. As a result of determination, if no specific stroke, a recognition program 206 is executed in the same manner as a normal one-character recognition process, so that the recognition process is ended here.

The discrimination of the specific strokes is executed through a matching process of the input strokes with predetermined specific-strokes, taking stroke shapes and sizes into consideration. The matching process is carried out with a well-known technique such as a vectorization matching technique or a characteristic-point matching technique generally used for on-line character recognition. Since the input stroke data are time series data arranged in input order, the discriminating portion also output, to the next processing portion, information as to how many strokes there were before the specific stroke, together with discrimination information. Thus, the specific stroke is discriminated based upon the type of the specific stroke stored in a process table 204.

A specific-stroke extracting portion 202 extracts the specific stroke discriminated in the specific-stroke discriminating portion 201 from all the input strokes. Since a stroke sequence number corresponding to the specific stroke is found from the output of the specific-stroke discriminating portion 201, the specific stroke can be extracted from a string of input strokes, so that the input strokes can reconstitute a string of character-only input stroke data excluding the specific stroke.

A specific-process executing portion 203 executes, based on information stored in the process table 204, a specific process corresponding to the specific stroke discriminated in the specific-stroke discriminating portion 201. The process table 204 stores predetermined specific-stroke types and respective processes to be executed according to respective ones of the specific strokes.

A specific processing portion 205 is executed by the specific-process executing portion 203, and the contents of this process depend on the discriminated specific-stroke type, so that various processes are executed according to the respective specific strokes. For example, various calling processes are possible such as to execute a suitable program after obtaining the result of recognition by calling the recognition program 206, to control calling or end of the recognition process by setting, e.g., flags for the recognition process so that operation of the recognition process 206 can be controlled, and to control calling or end of an associated application, e.g., for recognizing registration.

As an operative example, the specific process 205 includes a handwriting-conversion process 210 for converting an input character into a handwriting one, a small-letter conversion process 211 for converting the input character into a small-letter pattern, and a character-registration process 212 for registering the input strokes as they are.

The character-recognition process 206 then recognizes a character from the input strokes.

Figure 3:
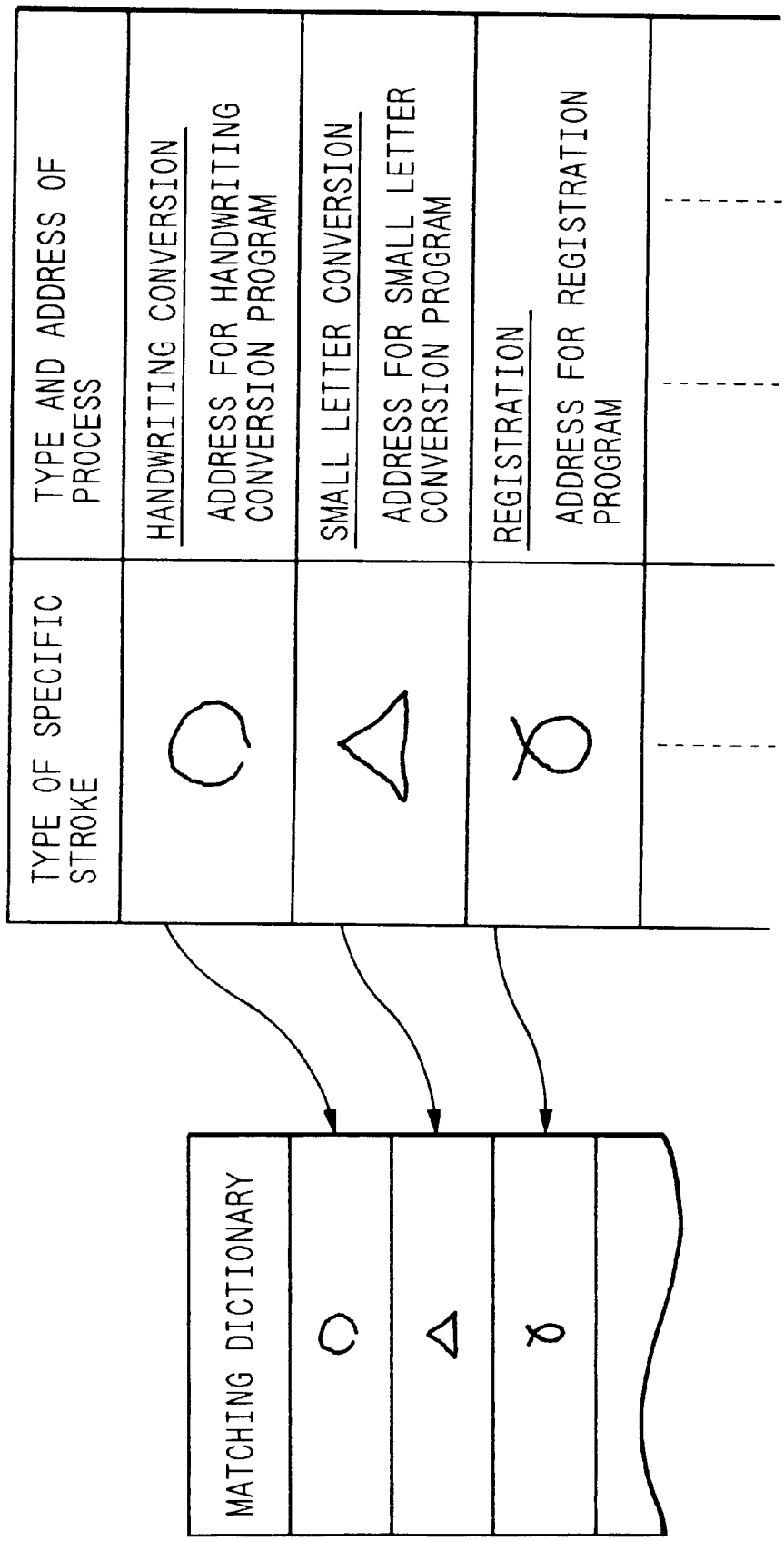
FIG. 3 is a diagram explaining a process executed in a specific-process executing portion.

Next, FIG. 3 shows the contents of the process table 104 as easily understood. In FIG. 3, the left items are types of specific strokes; the right items include the contents of specific processes to be executed based on the left items and calling addresses of respective processing programs.

In actual fact, means for matching strokes based on the types of the specific strokes, such as a matching dictionary, is stored in the specific-stroke discriminating portion in FIG. 2. Further, the contents of the specific process 205 to be executed include calling addresses for process execution. Setting of the calling addresses for respective specific processes is shown at 903 in FIG. 9 described later.

Such a process table is written in a memory, so that, if the contents of the table are rewritten, extension of predetermined specific-strokes and the contents of respective processes is possible.

Turning to FIG. 3, the description will be made more in detail.

When a specific stroke like "O" exists in one character of strokes, a character is recognized from all the character strokes but the extracted specific stroke and converted into a code so as to be output as a handwriting pattern. If the input character can not be converted, the character is output as it is. The handwriting-conversion process 210 for converting the character into such a handwriting pattern is included in the specific process 205 described above in FIG. 2. The handwriting-conversion process 210 is selectively executed by the specific-process executing portion 203, in which the recognition process 206 is called so as to receive a possible character code obtained from the result of recognition. The received character code is then converted into a code of a handwriting pattern.

When a symbol like "Δ" is input, the small-letter conversion process is executed in the same manner as mentioned in the handwriting conversion process. In other words, a character code obtained as a result of recognition is converted into a code of a small-letter pattern. Alternatively, if coordinate transformation is performed for all the strokes before recognized in the recognition process 206 so that coordinate points constituting a character stroke can be scaled down, the recognition process can be executed without code conversion by using the resulting data as an input to the recognition process.

When the last symbol like "γ" is input, the character-registration process is executed in the same manner as aforementioned. In this case, the input character strokes are used as inputs for character registration, so that data such as characteristic-point data is generated according to a character code input with a keyboard, and registered into the matching dictionary.

As described above, it is possible in the specific process 205 to execute various processes. In other words, the specific process 205 can include any other contents of processes as long as they can be realized by conventional programming techniques. For example, the specific process 205 may include a conversion process for converting a character input as a Hiragana in Japanese into a Kana.

Figure 5A:
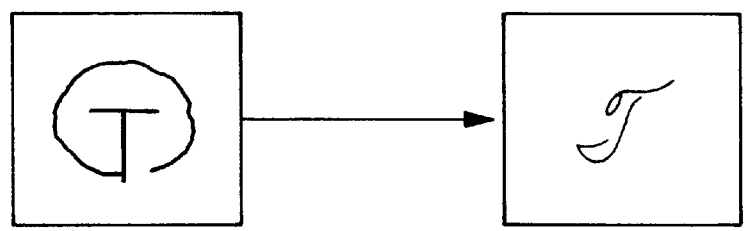
FIGS. 5A and 5B are illustrations each showing a sample obtained as a result of the handwriting conversion process, in which a specific stroke and a stroked character are input together and a process corresponding to the specific stroke is executed for the input character.
Figure 5B:
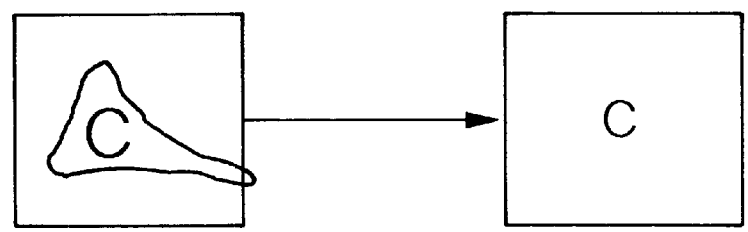

FIGS. 5A and 5B are illustrations each showing a character input pattern with a specific stroke written by an operator in the character input process and the result of the character recognition. In each of the drawings, the left side shows a path of the character pattern with a specific stroke written within the character frame; the right side shows an example of a resulting pattern to be displayed which is recognized through a specific process directed by the specific stroke.

In FIG. 5A, a stroke like "O" is written together with a character, and the handwriting-conversion process is executed. In this case, as discussed on the specific-stroke discriminating portion in FIG. 2, the discrimination of the specific strokes is made in consideration of stroke shapes and sizes, so that the stroke "O" and a character element such as "○" used for "Å", for example, can be prevented from getting mixed. Also, in the specific-stroke discrimination process, all the strokes are discriminated, so that the stroke "O" can be written anytime in the input process.

The specific stroke "O" discriminated as aforementioned is then extracted, so that the handwriting-conversion process is executed for the strokes of a character "T".

In the handwriting-conversion process, recognition of the input strokes is first executed. As a result of the recognition, a code corresponding to the character "T" is selected as a possible code so as to output a handwriting character "T" through a character-code conversion.

Figure 4:
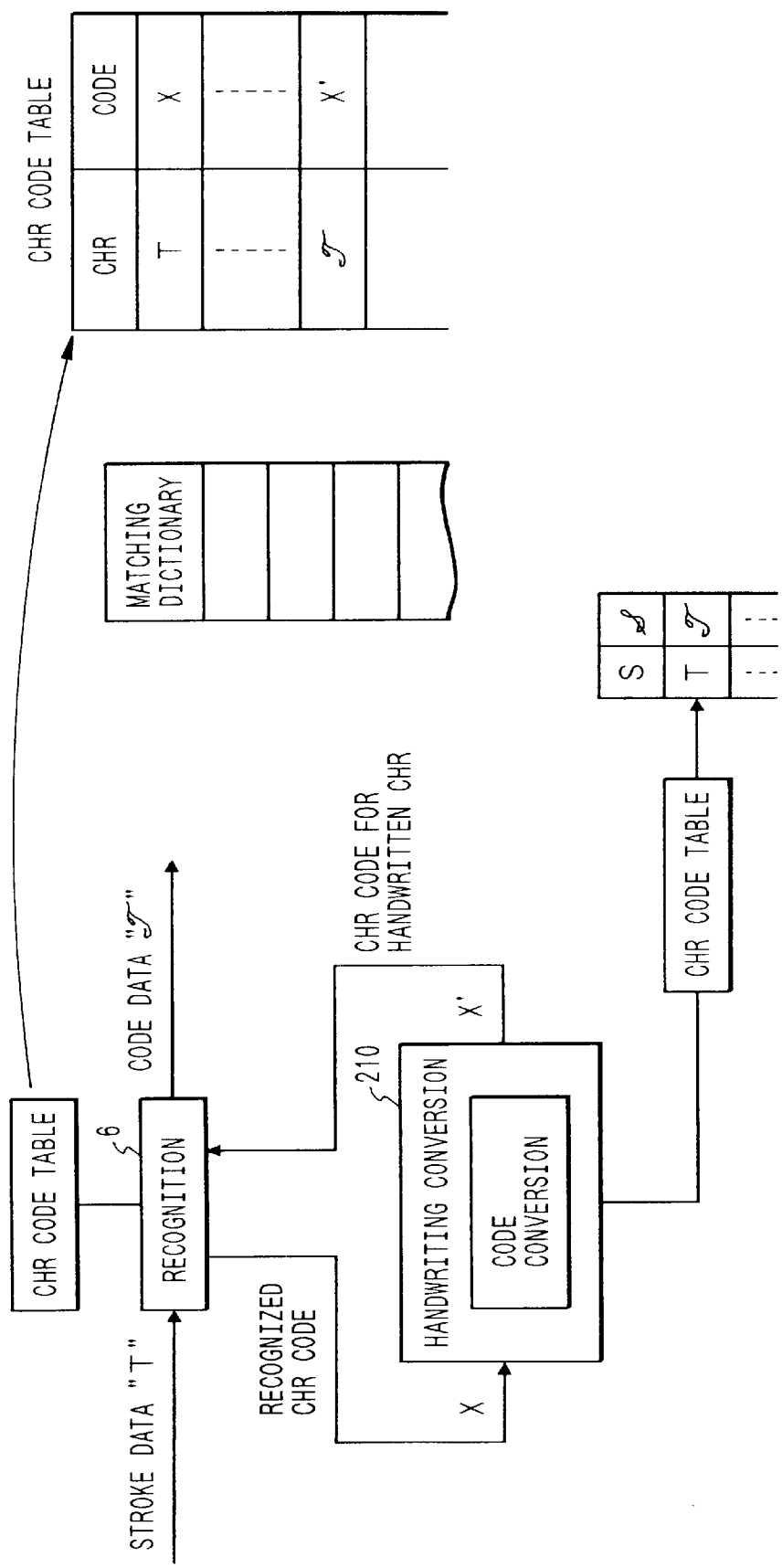
FIG. 4 is a diagram explaining a handwriting conversion process.

FIG. 4 is a flowchart partially showing the handwriting-conversion process 210 and the recognition process 206 to ease the understanding of the handwriting-conversion process described above.

On the other hand, FIG. 5B shows a case of the small-letter conversion, in which, after a specific stroke is extracted and recognized in the same manner as described in the handwriting-conversion process in FIG. 5A, small-letter code conversion is executed for a possible character "C", and a small letter "c" is output.

In this case, if coordinate transformation is performed for all the strokes after extracting the stroke "Δ" so that coordinates of the character stroke data itself can be scaled down relatively to the character frame, the resulting small letter can be obtained through the normal recognition process.

Figure 6:
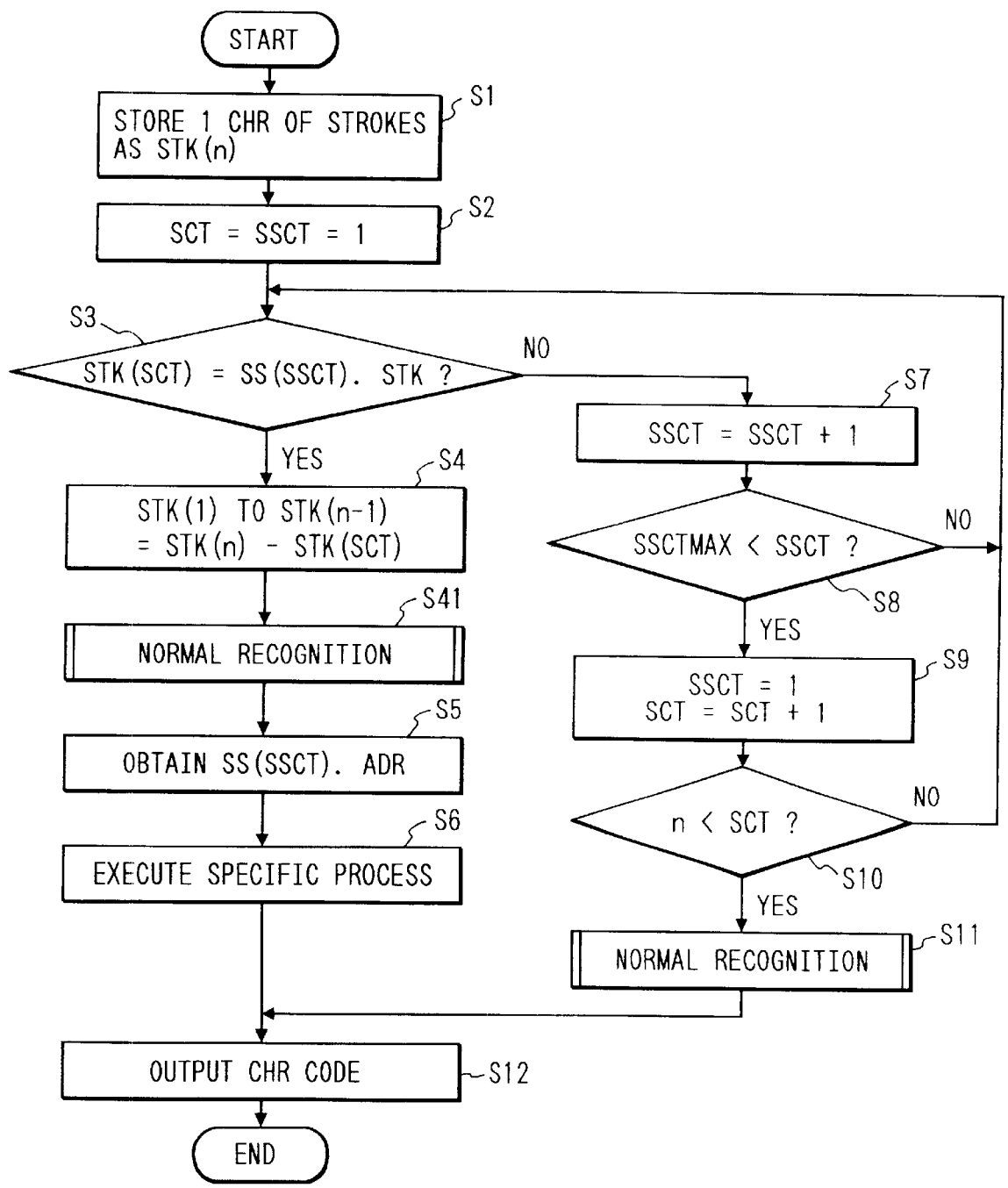
FIG. 6 is a flowchart showing processing steps of a character-recognition process.

FIG. 6 shows processing steps of executing the character-recognition process according to the embodiment discussed above. Referring to the drawing, operation of the process will be described below.

At first in step S1, n strokes for one character are stored in the RAM 103 in input order as a stroke array of stk (n), where n=1, 2, 3, . . . Exemplary strokes stored in a stroke array of n=3 are shown at 901 in FIG. 9.

Then, in step S2, a control variable "sct" indicating sequence numbers of respective strokes and an index variable "ssct" pointing a position of a specific stroke array "stk" stored in the process table 104 (hereinbelow, the table may be simply referred as to "ss") are both initialized to "1".

In step S3, matching of one input stroke "stk (sct)" with a specific stroke "ss(ssct).stk" stored in the process table 104 is performed and, if matching is made, the process goes to step S4. If no matching occurs, it goes to step S7. The exemplary stroke data stored in the specific stroke "ss(ssct).stk" are shown at 902 in FIG. 9.

Next, step S7 and subsequent steps are described below.

In step S7, the index variable "ssct" in the process table 104 is shifted by one (ssct=ssct+1). Then, determination is made in step S8 as to whether the index has been shifted to the last of the process table. If not the last, the process is returned to the stroke matching process in step S3 with a new index, that is, ssct=ssct+1. If the matching has been performed up to the last in the process table 104, the process goes to step S9.

In step S9, the index in the process table 104 is returned to the first (ssct=1), the variable "sct" exhibiting sequence numbers of respective input strokes is counted up by one so that the input stroke to perform matching can be shifted to next one.

In step S10, a check is made on whether the "sct" exceeds n strokes in number and, if more than n, all the strokes are regarded as having been checked and the process goes to step S11. In this case, it is considered that no specific stroke exists in all the input strokes. On the contrary, if not more than n, the process returns to step S3 so that operation from steps S3 to S10 are repeated by using a new stroke as a matching object.

Figure 9:
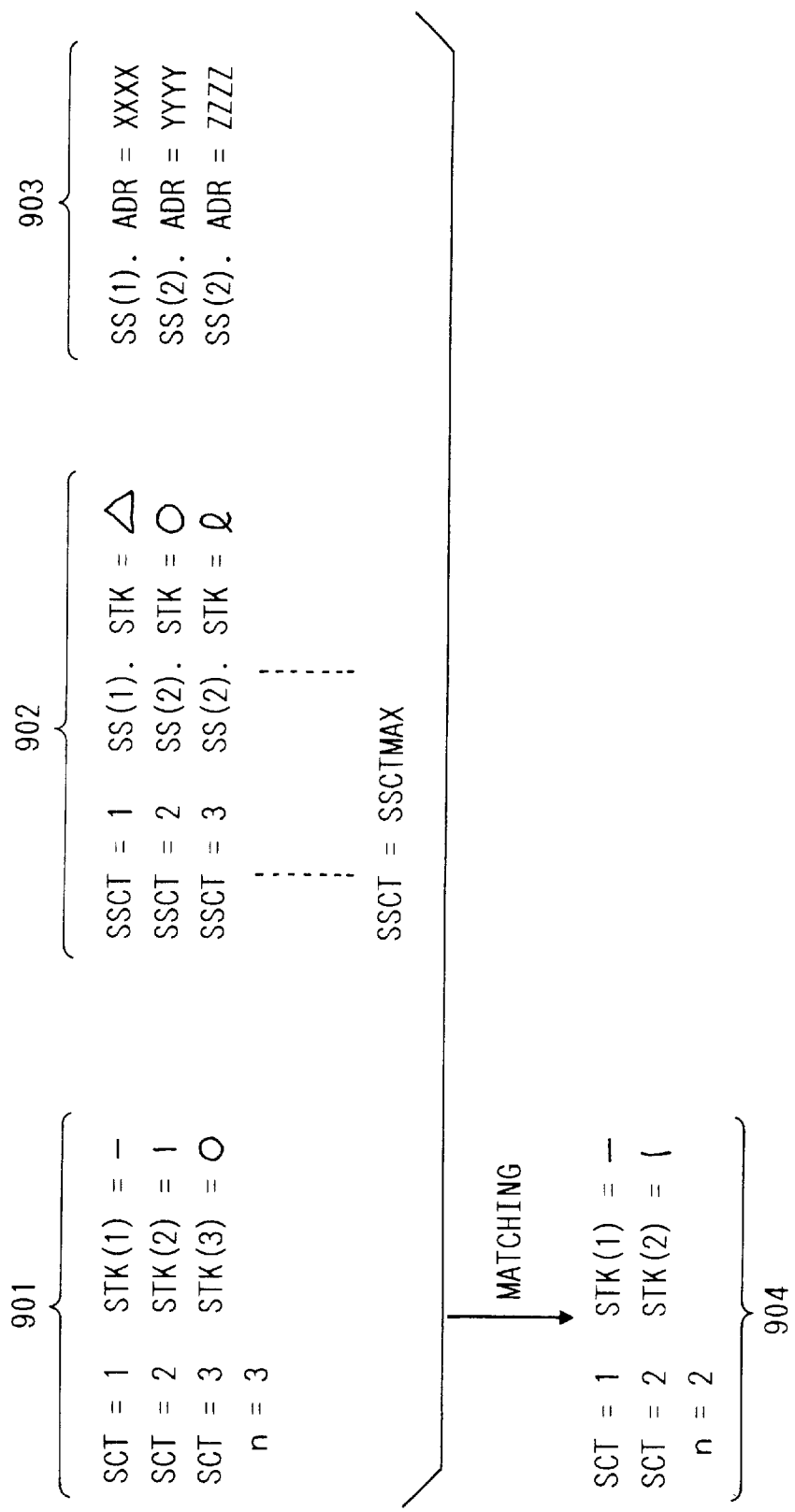
FIG. 9 is a diagram showing examples of internal processing data used in the first embodiment of the present invention.

Thus, matching of all the input strokes with specific strokes of the process table is performed. Accordingly, a specific stroke can be discriminated even if the specific stroke appears in any sequence number in the input strokes. FIG. 9 shows a state that respective strokes for one character to be recognized are stored in the stroke array "stk" after extracting a specific stroke or strokes as a result of matching.

Finally, in step S11, normal character recognition is executed in one character unit and the whole process of the character recognition is ended.

It will be understood that the discrimination of a specific stroke can be realized by a simpler process, instead of the process according to the embodiment, if the specific stroke is restrictively input in its predetermined turn, such as first or last.

Turning to the stroke matching process in step S3, if a specific stroke exists here, the process goes to step S4.

In step S4, the specific stroke "stk(sct)" is extracted from the input stroke array "stk(n)" and the data stk(1) to stk(n-1) are generated. Thus, the character recognition is executed for the data stk(1) to stk(n-1) in step S41.

Then, a processing address "ss(ssct).adr" to the process table "ss(ssct)" is extracted in step S5 in order to execute a specific process corresponding to the specific stroke. FIG. 9 shows examples of the process address "ss(ssct).adr" set for calling the respective processes in the specific process 205, in which XXXX, YYYY and ZZZZ indicate the addresses to the respective processes.

In step S6, the specific process pointed by the address is called. The recognition process is thus ended here. Finally, a character code obtained as a result of the recognition is output in step S12 and the whole process is ended.

In the operation such as above, if a specific stroke is written together with a character in the character input process, a specific process can be executed according to the type of the specific stroke.

Notedly, a stroke of new type can be registered in the matching dictionary by generating characteristic points from the data stk(1) to stk(n-1).

Second Embodiment

Although the character recognizing method according to the first embodiment of the present invention uses symbols capable of one-stroke writing and capable of discriminating it from character elements in shape and size, such as "O" or "Δ", as examples of specific strokes, the second embodiment shows an exemplary process for which such limitation is unnecessary.

Figure 7A:
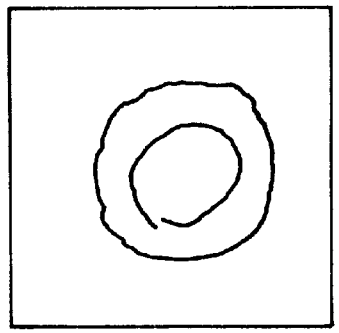
FIGS. 7A and 7B are illustrations each showing a specific stroke used in a second embodiment of the present invention.
Figure 7B:
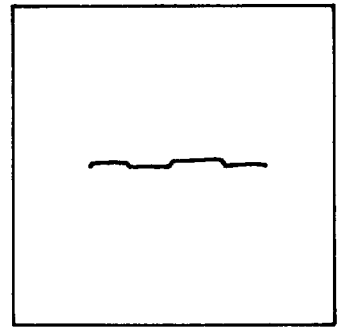

FIGS. 7A and 7B show exemplary specific strokes used in the second embodiment. The stroke in FIG. 7A is a double circle written with two strokes each of which corresponds to a single circle.

The stroke in FIG. 7B is a cross bar which is drawn from the right to the left so as to be regarded as a specific stroke. In other words, the cross bar can be discriminated from a character element such as a hyphen using such a characteristic since the cross bar "-" as a character element is normally drawn from the left to the right.

As such above, the specific strokes which involve difficulties in shape discrimination can be discriminated using information such as on an input direction of the stroke. This depends on the matching method used in the specific-stroke discriminating portion 201 in FIG. 2. As discussed above, well-known matching methods for on-line character recognition can be used in the present invention and, if only the characteristic-point matching method is used, matching can be performed independently of the stroke direction. If the vectorization matching method is used, the stroke direction can be used as a matching object, so that even the stroke having such shapes as mentioned in FIG. 7B can be discriminated from character elements based on the input direction.

It will be understood that any types of specific strokes can be adopted as long as they can be discriminated from character elements.

When discriminating a symbol composed of a plurality of strokes as shown in FIG. 7A, the stroke matching method itself may be the same as aforementioned, but different in stroke specifying and stroke extracting method. Hereinbelow, a description will be made to processing steps in such a case of FIG. 7A with reference to FIG. 8.

Figure 8:
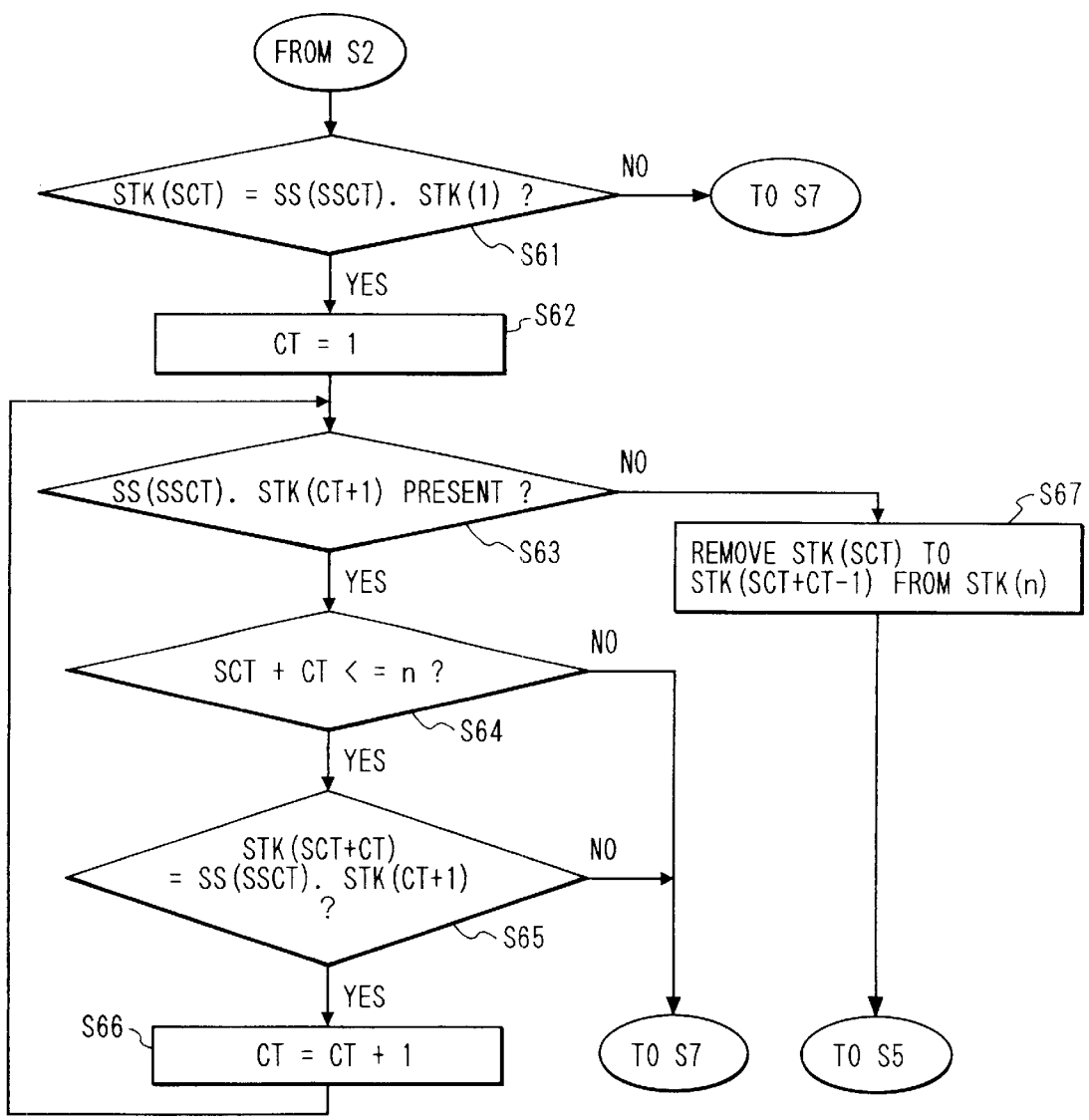
FIG. 8 is a flowchart partially showing processing steps of a character-recognition process according to the second embodiment of the present invention.

FIG. 8 is a flowchart partially showing processing steps in a character recognition process according to the second embodiment, the processing steps corresponding to steps S3 and S4 described above in FIG. 6. The remaining processing steps are the same as those in FIG. 6 and, therefore, the description thereof is omitted.

Step S61 in FIG. 8 is incorporated instead of step S3 in FIG. 6, in which the contents of the process table (104) are different from those in the first embodiment. In other words, the process table (104) stores specific strokes each composed of plural strokes as shown in FIG. 7A, so that each stroke data stored in the process table is arranged in an array. For example, since the double circle is written with two strokes, the data is described as follows:

$$ss(ssct).stk(1), ss(ssct).stk(2)$$

Consequently, the stroke data "stk(sct)" describing the input stroke is compared in step S61 with the first stroke data "ss(ssct).stk(1)" stored in the process table (104). This stroke comparison means is the same as that used in the specific-stroke discriminating portion 201 of the first embodiment. If no matching occurs as a result of the comparison, the process goes to step S7 in FIG. 6. If matching is made, the process goes to step S62 in FIG. 8 and a stroke counter "ct" is initialized to "1".

Then, determination is made in step S63 as to whether a stroke subsequent to the specific stroke data exists in the process table, that is, whether "ss(ssct).stk(ct+1)" exists. If present, the process goes to step S64 and a check is made on whether any other input stroke exists, that is, whether "sct+ct" is more than n input strokes in number.

If more than n, it is regarded as no matching and the process moves to step S7. If not more than n, the process goes to step S65, where the next input stroke "stk(sct+ct)" is compared with stroke data "ss(ssct).stk(ct+1)" subsequent to the processed specific stroke data in the process table. If no matching occurs as a result of the comparison, the process moves to step S7 in FIG. 6. If matching is made, it goes to the next step S66.

In step S66, the stroke counter "ct" is counted up by an increment and the process returns to step S63.

As such above, the processing steps S63 to S66 are repeatedly executed until all the strokes constituting a specific stroke are completely compared, the specific stroke directing a process stored in the process table 104. After end operation of comparing all the strokes, the process moves to step S67. When all the input strokes have been compared, if no matching occurs in the comparison loop of steps S63 to S66, it is regarded as no specific stroke matched with a predetermined specific stroke data, and the process moves to step S7 in FIG. 6 as aforementioned.

If matching is made with respect to a specific stroke, a plurality of input strokes "stk(sct) to stk(n−ct−1)" constituting the specific stroke are extracted from the input stroke array "stk(n)" in step S67, and the process goes to step S5 in FIG. 6.

With the sample of the specific stroke in FIG. 7A, the processing steps S63 to S66 are executed until two strokes of the double circle are each matched with a specific stroke data in the process table so as to direct a process to be executed therefor.

As such above, even if a symbol to be discriminated is constituted of plural strokes, discrimination process can be executed therefor through the above processing steps.

It will be understood that, even when a number of symbols each having specific strokes exist in the input strokes, a plurality of processes can be executed for each symbol by storing processing addresses before executing step S6 in FIG. 6, so that the process is repeatedly executed from step Si.

Thus, the number of specific strokes to be discriminated can be freely set by slightly altering the specific-stroke discriminating portion and the process table.

Further, types of specific strokes and processes can be easily changed by an operator or user if the process table is designed to be rewritable.

FIG. 10 shows internal data in the character recognition process according to the second embodiment, in which numerals 1001, 1002, 1003 and 1004 indicate data arrays corresponding to the input stroke array 901, the specific stroke data array 902 constituting a template, the address pointers 903 operative to point an address to a respective process, and the stroke array 904 arranging all the strokes but a specific stroke or strokes, respectively shown in the first embodiment in FIG. 9.

Although each of the above embodiments has shown an example of handwriting conversion of an input character, Kana-Kanji conversion can be executed instead of the handwriting conversion so as to convert an input Kana character into a corresponding Kanji pattern.

The present invention can be applied to a system constituted of plural devices, or to an apparatus having a single device. Also, the present invention may be applied to a case that the system or the apparatus is implemented by loading desired programs thereto.

As described above, a character recognizing apparatus according to the present invention is constituted such that, when inputting at least one specific stroke additionally in the input process, a process is executed for the specific stroke at the time of input-character recognition, so that a user can input a command for the input character at the same time in the character input process without taking notice of input scenes on which the command and the character are input individually. This differs from the conventional apparatus or system where a gesture command needs entering after end operation of the character recognition. Accordingly, an efficient and comfortable operating environment can be obtained.

Also, the present invention allows a pen input system to set any command freely without getting mixed with gesture commands previously incorporated in the pen input system itself. This makes it possible to provide an identical operating environment in the character input process regardless of which computer incorporates the handwriting-character recognizing apparatus of the present invention when it used as a front-end processor in the same manner as a Kana-Kanji converting apparatus. Accordingly, the user can: operate it without operational confusion between different computer systems, and freely incorporate commands unsupported due to a difference between the computer systems or recognition commands unique to the user, thus obtaining a high-performance recognizing apparatus.

What is claimed is:

1. An information processing method comprising the steps of:

inputting a plurality of strokes together, the plurality of strokes including a target stroke for a recognition process and at least one stroke matching one of a plurality of predetermined patterns corresponding to respective predetermined processes, wherein the at least one stroke matching one of the plurality of predetermined patterns is intermingled with the target stroke, for which the recognition process has not been executed;

determining, by pattern matching, whether the plurality of input strokes includes the at least one stroke matching one of the plurality of predetermined patterns corresponding to the predetermined processes;

extracting, when said determining step determines that the plurality of input strokes includes the at least one input stroke matching one of the predetermined patterns, the at least one input stroke matching one of the plurality of predetermined patterns, from the plurality of input strokes;

selecting a predetermined process corresponding to the predetermined pattern matching the at least one input stroke extracted in said extracting step;

recognizing the target stroke remaining after said extracting step has extracted the at least one input stroke from the plurality of input strokes; and executing the selected predetermined process for a result of the recognition in said recognizing step.

2. The method according to claim 1, further including a step of determining a break position between the input strokes, wherein said step of determining the break position is executed in each unit of said plurality of strokes bordered by two break positions.

3. The method according to claim 2, wherein said step of determining the break position is executed by detecting stroke input frame information indicating that a stroke input is shifted from one input frame to another.

4. The method according to claim 2, wherein said step of determining the break position is executed by detecting a stroke-inputting interval more than a predetermined period of time.

5. The method according to claim 1, wherein all said strokes but the extracted one constitute a symbol.

6. The method according to claim 5, wherein all said strokes but the extracted one constitute a character.

7. The method according to claim 5, wherein said plurality of predetermined patterns have a characteristic not included in said symbol.

8. The method according to claim 7, wherein the characteristic included in said plurality of predetermined patterns but excluded from said symbol is a stroke input direction.

9. The method according to claim 1, wherein said predetermined process is a conversion process for converting a capital letter into a small letter.

10. The method according to claim 1, wherein said predetermined process is a conversion process for converting the character into a handwriting pattern.

11. The method according to claim 1, wherein said predetermined process is a registration process for registering data of all said strokes but the extracted one.

12. The method according to claim 1, wherein said predetermined process is a conversion process for converting the character into a Kanji pattern.

13. The method according to claim 1, wherein said strokes are input with a digitizer.

14. The method according to claim 1, wherein the result of executing said predetermined process for all said strokes but the extracted one is displayed on a liquid crystal display.

15. A method according to claim 1, wherein the predetermined pattern comprises one stroke.

16. A method according to claim 1, wherein said recognizing step comprises the step of character recognizing the strokes remaining after said extracting step and converting the result into a code, and wherein said executing step executes the selected predetermined process for the code.

17. An information processing apparatus comprising:

input means for inputting a plurality of strokes together, the plurality of strokes including a target stroke for a recognition process and at least one stroke matching one of a plurality of predetermined patterns corresponding to respective predetermined processes, wherein the at least one stroke matching one of the plurality of predetermined patterns is intermingled with the target stroke, for which the recognition process has not been executed;

determination means for determining, by pattern matching, whether the plurality of input strokes includes the at least one stroke matching one of the plurality of predetermined patterns corresponding to the predetermined processes;

extraction means for extracting, when said determination means determines that the plurality of input strokes includes the at least one input stroke matching one of the predetermined patterns, the at least one input stroke matching one of the plurality of predetermined patterns, from the plurality of input strokes;

process selection means for selecting a predetermined process corresponding to the predetermined pattern matching the at least one input stroke extracted by said extraction means;

recognizing means for recognizing the target stroke remaining after the extraction means has extracted the at least one input stroke from the plurality of input strokes; and execution means for executing the selected predetermined process for a result of the recognition by said recognizing means.

18. The apparatus according to claim 17, further including break-position determination means for determining a break position between the input strokes, wherein said input means input strokes in each unit of the plurality of strokes bordered by two break positions.

19. The apparatus according to claim 18, wherein said break-position determination means determines said break position by detecting stroke input frame information indicating that a stroke input is shifted from one input frame to another.

20. The apparatus according to claim 18, wherein said break-position determination means determines said break position by detecting a stroke-inputting interval more than a predetermined period of time.

21. The apparatus according to claim 17, wherein all said strokes but the extracted one constitute a symbol.

22. The apparatus according to claim 21, wherein all said strokes but the extracted one constitute a character.

23. The apparatus according to claim 21, wherein one of said plurality of predetermined patterns have a characteristic not included in said symbol.

24. The apparatus according to claim 23, wherein the characteristic included in the one of said plurality of predetermined patterns but excluded from said symbol is a stroke input direction.

25. The apparatus according to claim 17, wherein said predetermined process is a conversion process for converting a capital letter into a small letter.

26. The apparatus according to claim 17, wherein said predetermined process is a conversion process for converting the character into a handwriting pattern.

27. The apparatus according to claim 17, wherein said predetermined process is a registration process for registering data of all said strokes but the extracted one.

28. The apparatus according to claim 17, wherein said predetermined process is a conversion process for converting the character into a Kanji pattern.

29. The apparatus according to claim 17, wherein said input means is a digitizer.

30. The apparatus according to claim 17, further including a liquid crystal display on which the result of executing said predetermined process for all said strokes but the extracted one is displayed.

31. An apparatus according to claim 17, wherein the predetermined pattern comprises one stroke.

32. An apparatus according to claim 17, wherein said recognizing means comprises means for character recognizing the strokes remaining after extraction by said extraction means and converting the result into a code, and wherein said execution means executes the selected predetermined process for the code.

33. A readable memory for a computer, said memory containing codes to control the computer to perform a process wherein a plurality of strokes are input to the computer together, the plurality of strokes including a target stroke for a recognition process and at least one stroke matching one of a plurality of predetermined patterns corresponding to respective predetermined processes, wherein the at least one stroke matching one of the plurality of predetermined patterns is intermingled with the target stroke, for which the recognition process has not been executed;

a determination is made, by pattern matching, whether the plurality of input strokes includes the at least one input stroke matching one of the plurality of predetermined patterns corresponding to the predetermined processes, when it is determined that the plurality of input strokes includes the at least one input stroke matching one of the predetermined patterns, the at least one input stroke matching one of the predetermined patterns is extracted from the plurality of input strokes, a predetermined process is selected corresponding to the predetermined pattern matching the at least one input stroke that was extracted, recognition is performed for the target stroke remaining after extraction of the at least one input stroke from the plurality of input strokes; and the selected predetermined process is executed for a result of the recognition in said recognition step.

34. The memory according to claim 33, wherein a break position between the input strokes is determined, and stroke input is performed in each unit of the plurality of strokes bordered by two break positions.

35. The memory according to claim 33, wherein all said strokes but the extracted one constitute a symbol.

36. The memory according to claim 35, wherein all said strokes but the extracted one constitute a character.

37. The memory according to claim 35, wherein one of said plurality of predetermined patterns has a characteristic not included in said symbol.

38. The memory according to claim 37, wherein the characteristic included in the one of said plurality of predetermined patterns but excluded from said symbol is a stroke input direction.

39. The memory according to claim 33, wherein said predetermined process is a conversion process for converting a capital letter into a small letter.

40. The memory according to claim 33, wherein said predetermined process is a conversion process for converting the character into a handwriting pattern.

41. The memory according to claim 33, wherein said predetermined process is a registration process for registering data of all said strokes but the extracted one.

42. The memory according to claim 33, wherein said predetermined process is a conversion process for converting the character into a Kanji pattern.

43. The memory according to claim 33, wherein said strokes are input with a digitizer.

44. The memory according to claim 33, wherein the result of executing said predetermined process for all said strokes but the extracted one is displayed on a liquid crystal display.

45. A memory according to claim 33, wherein the predetermined pattern comprises one stroke.

46. A memory according to claim 33, wherein the recognition comprises character recognizing the strokes remaining after the extraction and converting the result into a code, and wherein the selected predetermined process is executed for the code.

* * * * *